Patented July 10, 1934

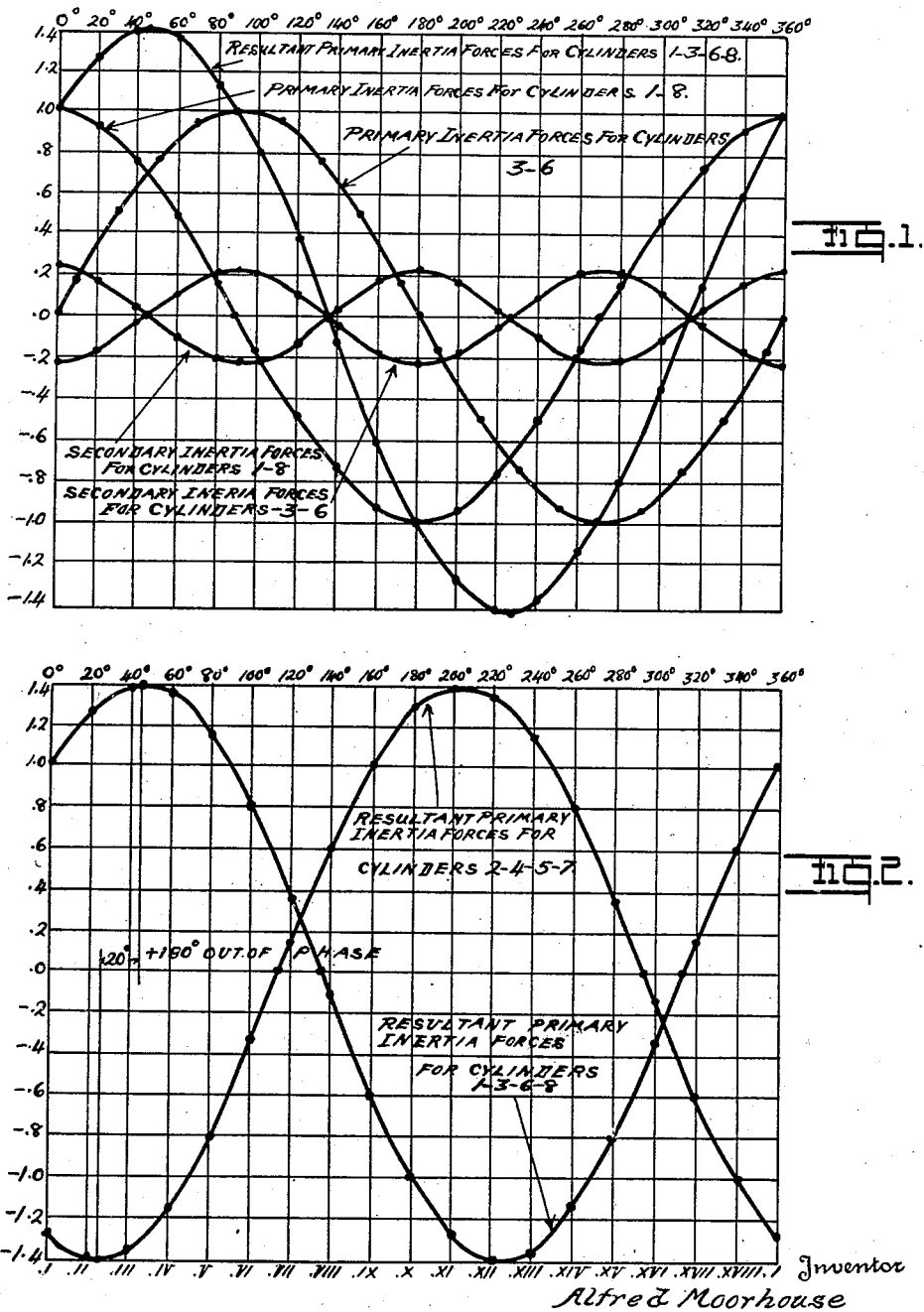

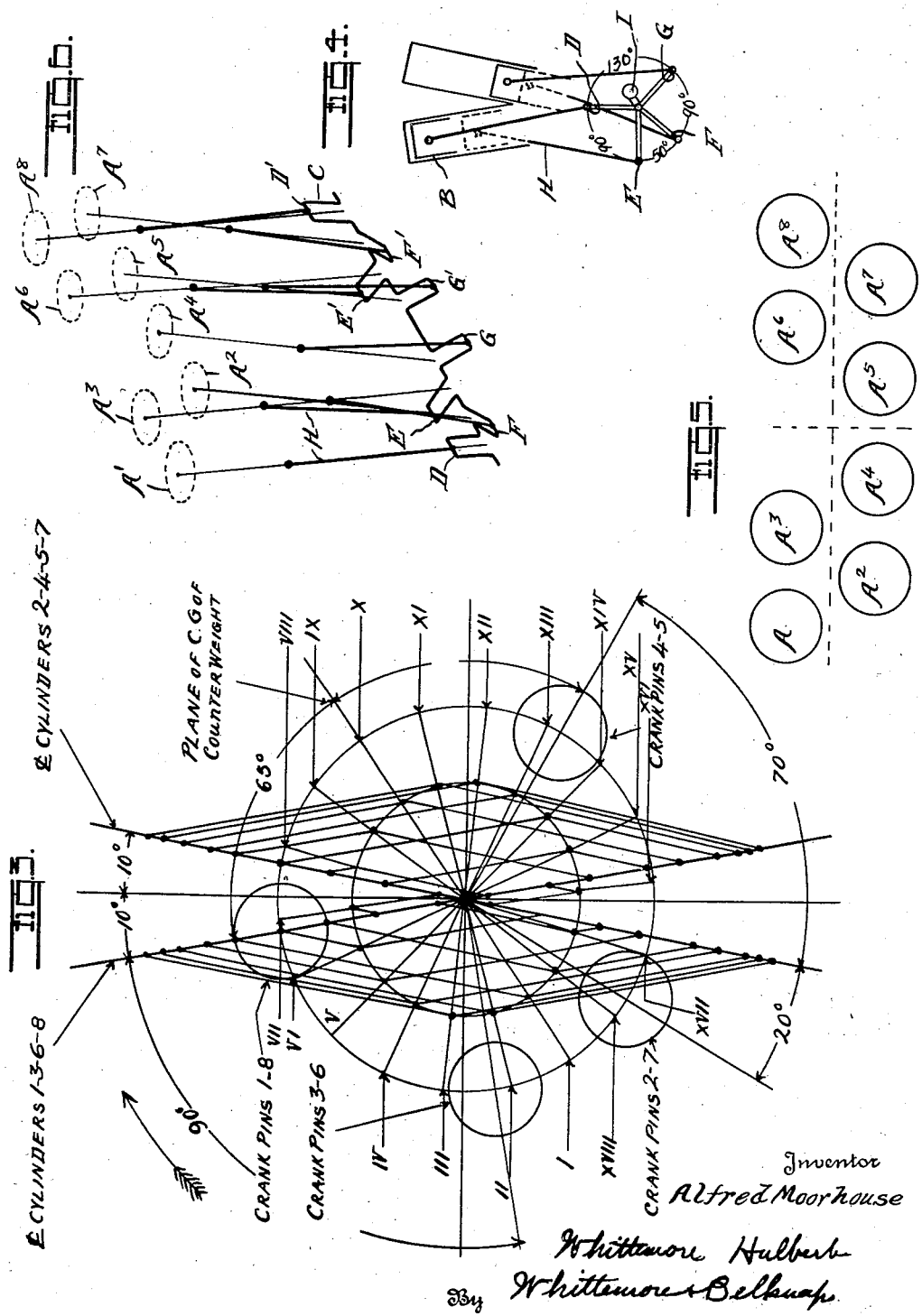

1,966,183

UNITED STATES PATENT OFFICE 1,966,183

BALANCED V-TYPE MULTICYLINDER MOTOR

Alfred Moorhouse, Detroit, Mich.

Application January 18, 1933, Serial No. 652,370

3 Claims. (Cl. 74—38)

The invention relates to V-type multi-cylinder motors and it is the object of the invention to obtain a construction in which the inertial forces in the running parts are in balance. It is a well-known fact that in a four cylinder motor these inertial forces due to connecting rod angularity are not in balance. It is also known that in an eight cylinder motor in which all of the cylinders are in the same plane the inertial forces can be balanced. However, an eight cylinder motor of the V-type is the equivalent of two four cylinder motors, each of which separately considered is not in balance and which do not compensate for each other.

It is the primary object of the present invention to so modify a V-type motor having a minimum of eight cylinders as to permit of balancing the inertial forces and solely by the crank shaft construction. To this end the invention consists in the construction as hereinafter set forth.

In the drawings:

Figs. 1, 2 and 3 are diagrams illustrating the mathematical principles involved in my improved construction;

Fig. 4 is a diagrammatic elevation of the motor;

Fig. 5 is a diagrammatic plan view thereof, and

Fig. 6 is a diagrammatic perspective view.

To more clearly understand the principles involved in my improved construction, the following mathematical analysis of the forces involved is given:

The forces due to the inertia of reciprocating parts have been analyzed and computed as applying to four stroke eight cylinder engines of the small angle V type with the idea of devising an arrangement of the crank shaft and cylinders which would produce a balanced engine.

A clear understanding of how a balance of reciprocating parts can be obtained in an engine of this type can best be grasped, by considering first, the inertia forces acting in one-half of the engine or in four cylinders in one plane.

The cylinder arrangement of the engine under consideration is in the form of a small angle V with four cylinders in each plane of the V. Viewing the engine from the front, cylinders 1—3—6—8 are in the left plane and cylinders 2—4—5—7 are in the right plane.

The reciprocating parts in one-half of the engine or in cylinders 1—3—6—8 are arranged with 1 and 8 in the same phase and with 3 and 6 in phase but with a difference in phase relationship of 90 degrees between the two pairs, 1—8 being considered as a pair and likewise 3—6 as a pair.

With this arrangement of reciprocating parts we will now analyze the nature of the inertia forces applying to one-half of the engine.

The equation for expressing the forces due to the inertia of the reciprocating parts of one cylinder is:
where $$F_a = 0.0000142 \ WLN^2 \left( \cos\theta + \frac{1}{2n} \cos 2\theta \right)$$

$F_a$ = Inertia force in pounds
$W$ = Weight of reciprocating parts of one cylinder
$L$ = Length of stroke in inches
$N$ = Revolutions per minute of engine
$n$ = Ratio of connecting rod length to the length of stroke
$\theta$ = Angle between the vertical center line of the engine and a line drawn through the centers of the crank shaft and crank pin at any crank shaft position.

Since the first part of the equation $0.0000142 \ WLN^2$ is constant for any given engine at any given speed it is not required here to show the character of the inertia forces.

The factor in this equation enclosed in parenthesis consists of two terms, viz: $\cos\theta$ and $$\frac{1}{2n} \cos 2\theta.$$

Each of these terms when plotted forms a sine curve, as shown in Fig. 1, as primary and secondary inertia forces. It will be observed that the term $\cos\theta$ is primary in order whereas the term $$\frac{1}{2n} \cos 2\theta$$

is secondary in order. The values of these terms for crank angles in increments of 10 degrees are given in Table I and are computed for an $(n)$ quantity or ratio of rod length to length of stroke of 2¼.

Table I

| θ | 2θ | Cos θ | 1 Cos 2θ | Cos θ⊦1 Cos 2θ |
|---|---|---|---|---|
| 0 | 0 | 1.0000 | .222 | 1.222 |
| 10 | 20 | 0.9848 | .209 | 1.194 |
| 20 | 40 | 0.9397 | .170 | 1.110 |
| 30 | 60 | 0.8660 | .111 | 0.977 |
| 40 | 80 | 0.7660 | .039 | 0.805 |
| 50 | 100 | 0.6428 | −.039 | 0.604 |
| 60 | 120 | 0.5000 | −.111 | 0.389 |
| 70 | 140 | 0.3420 | −.170 | 0.172 |
| 80 | 160 | 0.1736 | −.209 | −.035 |
| 90 | 180 | 0.0 | −.222 | −.222 |
| 100 | 200 | −0.1736 | −.209 | −.383 |
| 110 | 220 | −0.3420 | −.170 | −.512 |
| 120 | 240 | −0.5000 | −.111 | −.611 |
| 130 | 260 | −0.6428 | −.039 | −.682 |
| 140 | 280 | −0.7660 | .039 | −.727 |
| 150 | 300 | −0.8660 | .111 | −.755 |
| 160 | 320 | −0.9397 | .170 | −.770 |
| 170 | 340 | −0.9848 | .209 | −.776 |
| 180 | 360 | −1.0000 | .222 | −.778 |

By referring to Figure 1 it will be seen that the primary and secondary forces have been plotted representing the inertia forces of cylinders 1—8 in phase with the correct relationship of primary force to 3—6 in phase but out of phase with 1—8 by 90 degrees. It will be noted that the secondary forces of 1—8 are of equal magnitude but opposed to those of 3—6, therefore the resultant secondary forces are equal to zero. The primary forces of 1—8 and 3—6 not being opposed have been algebraically added and are shown by a resultant primary force curve for all four cylinders, that is for 1—3—6—8.

It can now be shown that an eight cylinder engine may be considered simply as two four cylinder engines having a common crank shaft. The cylinders of such an engine may be arranged at various angles to each other but in this instance we are concerned primarily with V type engines having a small included angle of less than 45 degrees.

The analysis of the forces for a V type eight cylinder engine as given in this case are for an included angle of 20 degrees, but the method or design employed for obtaining balance is applicable to engines of other angles.

The forces as existing in four of the cylinders have been shown in Figure 1. As the crank arrangement is the same for the other four cylinders, Figure 1 can be said to represent the forces as applying to both sets of cylinders, the only difference being that of phase relationship between the two fours and the planes in which the forces act.

In the case of an engine having an included angle of 20 degrees the inertia forces of four of the cylinders act in a plane 10 degrees on one side of the vertical plane while those of the other four act in plane 10 degrees on the other side of the vertical, the force planes intersecting in this case at the crank shaft axis.

It can now be proven that by establishing a definite phase relationship between the reciprocating parts of four cylinders in one plane to the other four in the other plane the resultant unbalanced forces can be made to act at a uniform magnitude and in phase with the rotation of the crankshaft. The cancellation of such primary forces are thus rendered possible by simply providing counter-weighting on the crankshaft in the correct amount, plane and angle.

This desired phase relationship between the reciprocating parts of two sets of four cylinders (each with parts arranged as heretofore described) has been found both mathematically and by graphs to be as represented by Figure 3. This figure shows an end view of the crankshaft with lines 10 degrees each side of the vertical representing the axis of the planes of the right and left cylinders. Cylinders 1—3—6—8 being in the left plane in the order given from front to rear, and likewise cylinders 2—4—5—7 in the right plane.

The crank pins for cylinders 1—8 are shown in top dead center position. Crank pins 3—6 are shown 90 degrees before top dead center. The crank pins 2—4—5—7 for the right cylinders are shown out of phase in a clockwise direction 180 degrees plus the included angle of the V of 20 degrees or 200 degrees, that is, while cranks 1—8 are shown at top dead center for the left cylinders, cranks 2—7 are shown 200 degrees out of phase with 1—8 or 20 degrees past bottom dead center. Likewise, cranks 4 and 5 are 200 degrees out of phase clockwise from cranks 3—6 or 70 degrees before bottom dead center position.

Figure 2 represents the phase relationship of the resultant unbalanced primary inertia forces of cylinders 1—3—6—8 and cylinders 2—4—5—7, it being understood that these forces are acting in planes crossing each other at the line of zero force at an angle of 20 degrees.

Figure 3 is also a polar inertia force diagram showing the resultant unbalanced primary inertia force for 20 degrees increments of crankshaft movement. It will be noted that the resultant forces for each 20 degrees of crankshaft movement are shown by roman reference numerals I to XVIII, these references correspond with those given in Figure 2 and facilitate tracing the forces and components which produce the final resultants. As the resultant force is represented by a circle and as it is primary in character or according to crankshaft speed, it is apparent that reacting or cancelling forces can be provided by counter-weighting. It is further apparent that with the crank and cylinder arrangement employed no unbalanced couples exist and therefore counter-weighting is required in only one plane.

The angular location of the required counter-weighting is shown to be midway between the cranks having the greatest included angle and diametrically opposite the bisecting angle of the cranks having the smallest included angle.

Based upon the principles as above given, I have designed a construction of V-type motor in which the included angle between the two planes of the cylinder is less than 45° and preferably 20° or 25°. The crank shaft is formed with two sets of throws for the cylinders in the respective planes, each set comprising two pairs of throws with the members of each pair in the same plane and in symmetrical relation with respect to the longitudinal center of the crankshaft, while the planes of the respective pairs are at an angle of 90° to each other. The trailing throws in one set are angularly displaced from the leading throws in the following set by 90° less twice the included angle between the planes and the trailing throw of the latter set is angularly displaced from the leading throw of the first set by 90° plus twice the included angle between the planes. With such a construction of crank shaft it is only necessary to add eccentric counter-balancing weights so positioned as to have their center of gravity angularly located at the center of the larger angle between the throws of the two sets and in the plane of the longitudinal center of said crank shaft. Thus in the specific construction shown in Figs. 4 to 6, $A^1$, $A^3$, $A^6$, $A^8$ are the cylinders of the left bank; $A^2$, $A^4$, $A^5$, $A^7$ are the cylinders of the right bank, and the included angle between the planes of the two banks is 20°. B are pistons in the cylinders, C is a crank shaft having throws D, D' for cylinders $A^1$, $A^8$, throws E E' for cylinders $A^3$, $A^6$; throws F F' for cylinders $A^2$, $A^7$ and throws G G' for cylinders $A^4$, $A^5$; each pair of throws being in the same plane. The throws D D' are angularly advanced 90° from the throws E E'; the throws E E' are angularly advanced 90° less 40°, equalling 50° from the throws F F'; the throws F F' are angularly advanced 90° from the throws G G' and the throws G G' are angularly advanced 90° plus 40°, equalling 130° from the throws D D'. H are rods for connecting the throws with the pistons in their respective cylinders. This arrangement results in the phase relationship previously described.

It will be noted in Fig. 5 that the cylinders in each bank are in symmetrical relation with respect to the longitudinal center of the motor and that the same symmetrical relation exists between the crank throws which are in the same plane.

In operation, starting with the firing time of cylinders 1 and 8, the crank shaft will rotate through 90° to the time of firing cylinders 3 and 6; will then rotate 70° to the time of firing cylinders 2 and 7; 90° to cylinders 4 and 5, and 110° to cylinders 1 and 8. The counter-weights I are shown as angularly located midway between the throws G G' and D D', and in the planes of the cheek plates of the former throws. Thus when the motor is in operation all of the inertial forces will be in balance. This balancing effect is not, however, due to any particular order of firing in the cylinders, or in fact to any particular motive power employed. Thus the balance would be the same if the construction were used as an air compressor.

What I claim as my invention is:

1. A multi-cylinder V-type motor comprising two banks of cylinders in planes having an included angle of less than 45°, pistons in said cylinders, connecting rods for said piston and a crank shaft having two pairs of throws for the cylinders of each bank, the members of each pair being in the same plane and symmetrically arranged with respect to the longitudinal center of the crank shaft, the pairs of throws for each bank being at an angle of 90°, the trailing throws for one bank being angularly displaced from the leading throws for the other bank by 90° less twice the included angle between the banks, and the trailing throws for the latter bank being angularly displaced from the leading throws for the first bank by 90° plus twice the included angle, and a counter-weight for said crank shaft angularly located to have its center of gravity at the center of the largest angle between throws and in the plane of the longitudinal center of the crank shaft.

2. A multi-cylinder V-type motor comprising two banks of cylinders in planes having an included angle of less than 45°, pistons in said cylinders, connecting rods for said pistons, and a crank shaft having two pairs of throws for the cylinders of each bank connected to the respective rods, the members of each pair being in phase and the pairs for the same bank being out of phase 90°, the pairs of the different banks being out of phase in the direction of rotation 90° less the included angle between the planes and 90° plus the included angle between the planes, and counter-weighting means positioned to angularly locate its center of gravity at the center of the largest angle between throws and in the plane of the longitudinal center of the crank shaft.

3. A multi-cylinder V type motor comprising two banks of cylinders, pistons in said cylinders, connecting rods for said piston and a crank shaft having two pairs of throws for the cylinders of each bank, the members of each pair being in the same plane and symmetrically arranged with respect to the longitudinal center of the crank shaft, the pairs of throws for each bank being at an angle of 90°, the trailing throws for one bank being angularly displaced from the leading throws for the other bank by 90° less twice the included angle between the banks, and the trailing throws for the latter bank being angularly displaced from the leading throws for the first bank by 90° plus twice the included angle, and a counterweight for said crank shaft angularly located to have its center of gravity at the center of the largest angle between throws and in the plane of the longitudinal center of the crank shaft.

ALFRED MOORHOUSE.